(12) United States Patent
Gleyzer et al.

(10) Patent No.: US 9,703,638 B2
(45) Date of Patent: Jul. 11, 2017

(54) SYSTEM AND METHOD FOR SUPPORTING ASYNCHRONOUS INVOCATION IN A DISTRIBUTED DATA GRID

(71) Applicant: Oracle International Corporation, Redwood Shores, CA (US)

(72) Inventors: Gene Gleyzer, Lexington, MA (US); Robert H. Lee, San Carlos, CA (US); Mark A. Falco, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 129 days.

(21) Appl. No.: 14/322,540

(22) Filed: Jul. 2, 2014

(65) Prior Publication Data

US 2015/0186489 A1 Jul. 2, 2015

Related U.S. Application Data (60) Provisional application No. 61/921,320, filed on Dec. 27, 2013.

(51) Int. Cl.

| G06F 11/00 | (2006.01) |
|---|---|
| G06F 11/14 | (2006.01) |
| G06F 11/20 | (2006.01) |
| G06F 17/30 | (2006.01) |
| H04L 12/801 | (2013.01) |
| H04L 29/08 | (2006.01) |

(Continued)

(52) U.S. Cl.
CPC ........ *G06F 11/1446* (2013.01); *G06F 9/5027* (2013.01); *G06F 9/5061* (2013.01); *G06F 9/52* (2013.01); *G06F 11/1482* (2013.01); *G06F 11/2007* (2013.01); *G06F 17/30578* (2013.01); *G06F 17/30598* (2013.01); *H04L 47/10* (2013.01); *H04L 67/10* (2013.01); *H04L 67/1002* (2013.01); *G06F 11/20* (2013.01); *G06F 2209/505* (2013.01)

(58) Field of Classification Search
CPC .................................................. G06F 11/1446
See application file for complete search history.

(56) References Cited

U.S. PATENT DOCUMENTS

| 6,298,451 B1 * | 10/2001 | Lin ....................... G06F 9/5055 714/2 |
|---|---|---|
| 6,535,878 B1 | 3/2003 | Guedalia |

(Continued)

OTHER PUBLICATIONS

European Patent Office, International Searching Authority, International Search Report and Written Opinion dated Mar. 5, 2015 for International Application No. PCT/US2014/068659, 11 pages.

(Continued)

*Primary Examiner* — Christopher McCarthy
(74) *Attorney, Agent, or Firm* — Tucker Ellis LLP (57) ABSTRACT

Systems and methods can support asynchronous invocation in a distributed data grid with a plurality of server nodes. The system allows a server node in the distributed data grid to receive one or more tasks from a client, wherein said one or more tasks are associated with a unit-of-order. Furthermore, the system can execute said one or more tasks on one or more said server nodes in the distributed data grid, based on the unit-of-order that is guaranteed by the distributed data grid.

27 Claims, 8 Drawing Sheets

(51) Int. Cl.
*G06F 9/50* (2006.01)
*G06F 9/52* (2006.01)

(56) References Cited

U.S. PATENT DOCUMENTS

| | | | |
|---|---|---|---|
| 6,687,257 B1 | 2/2004 | Balasubramanian | |
| 7,219,103 B2 | 5/2007 | Vasudevan et al. | |
| 7,779,298 B2 * | 8/2010 | Challenger | G06F 11/1438 714/13 |
| 7,861,246 B2 * | 12/2010 | Lu | G06F 9/5072 709/201 |
| 8,046,780 B1 * | 10/2011 | Alcock | G06F 9/52 709/226 |
| 8,417,762 B2 * | 4/2013 | Branson | G06F 9/5027 709/201 |
| 8,484,340 B2 * | 7/2013 | Hogan | H04L 41/0896 709/221 |
| 8,495,193 B2 * | 7/2013 | Kuzhiyil | G06F 9/5038 709/223 |
| 8,688,850 B2 * | 4/2014 | Branson | H04L 12/4633 709/224 |
| 8,850,261 B2 * | 9/2014 | Blood | G06F 9/06 714/4.1 |
| 8,875,142 B2 * | 10/2014 | Shivanna | G06F 9/4881 714/1 |
| 8,938,638 B2 * | 1/2015 | Taranov | G06F 17/30578 714/13 |
| 9,152,491 B2 * | 10/2015 | Katou | G06F 11/079 |
| 9,286,107 B2 * | 3/2016 | Yamazaki | G06F 9/4893 |
| 2002/0103816 A1 | 8/2002 | Ganesh et al. | |
| 2003/0037133 A1 | 2/2003 | Owens | |
| 2005/0081097 A1 * | 4/2005 | Bacher | G06F 11/2023 714/13 |
| 2005/0213507 A1 | 9/2005 | Banerjee et al. | |
| 2006/0047836 A1 * | 3/2006 | Rao | H04L 63/0272 709/229 |
| 2006/0048157 A1 * | 3/2006 | Dawson | G06F 9/5072 718/104 |
| 2007/0226226 A1 * | 9/2007 | Mintz | G06F 9/5055 |
| 2008/0030764 A1 * | 2/2008 | Zhu | G06F 9/5038 358/1.15 |
| 2008/0216081 A1 | 9/2008 | Jackson | |
| 2008/0253283 A1 * | 10/2008 | Douglis | G06F 11/1482 370/228 |
| 2008/0263106 A1 | 10/2008 | Asherman et al. | |
| 2009/0210876 A1 | 8/2009 | Shen | |
| 2014/0068621 A1 | 3/2014 | Sitaraman | |

OTHER PUBLICATIONS

United States Patent and Trademark Office, Office Action Dated June 9, 2016 for U.S. Appl. No. 14/322,562, 15 pages.
United States Patent and Trademark Office, Office Action Dated Apr. 12, 2017 for U.S. Appl. No. 14/322,540, 15 Pages.

* cited by examiner

SYSTEM AND METHOD FOR SUPPORTING ASYNCHRONOUS INVOCATION IN A DISTRIBUTED DATA GRID

CLAIM OF PRIORITY

This application claims priority on U.S. Provisional Patent Application No. 61/921,320, entitled "SYSTEM AND METHOD FOR SUPPORTING ASYNCHRONOUS INVOCATION AND FLOW CONTROL IN A DISTRIBUTED DATA GRID" filed Dec. 27, 2013, which application is herein incorporated by reference.

CROSS REFERENCE TO RELATED APPLICATIONS

This application is related to the following patent application(s), each of which is hereby incorporated by reference in its entirety:

U.S. patent application titled "SYSTEM AND METHOD FOR SUPPORTING FLOW CONTROL IN A DISTRIBUTED DATA GRID", application Ser. No. 14/322,562, filed Jul. 2, 2014.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting task management in a distributed data grid.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand. This is the general area that embodiments of the invention are intended to address.

SUMMARY

Described herein are systems and methods that can support asynchronous invocation in a distributed data grid with a plurality of server nodes. The system allows a server node in the distributed data grid to receive one or more tasks from a client, wherein said one or more tasks are associated with a unit-of-order. Furthermore, the system can execute said one or more tasks on one or more said server nodes in the distributed data grid, based on the unit-of-order that is guaranteed by the distributed data grid.

DETAILED DESCRIPTION

Described herein are systems and methods that can support task management, such as asynchronous invocation and flow control, in a distributed data grid.

Distribute Data Grid

In accordance with an embodiment, as referred to herein a "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

Figure 1:
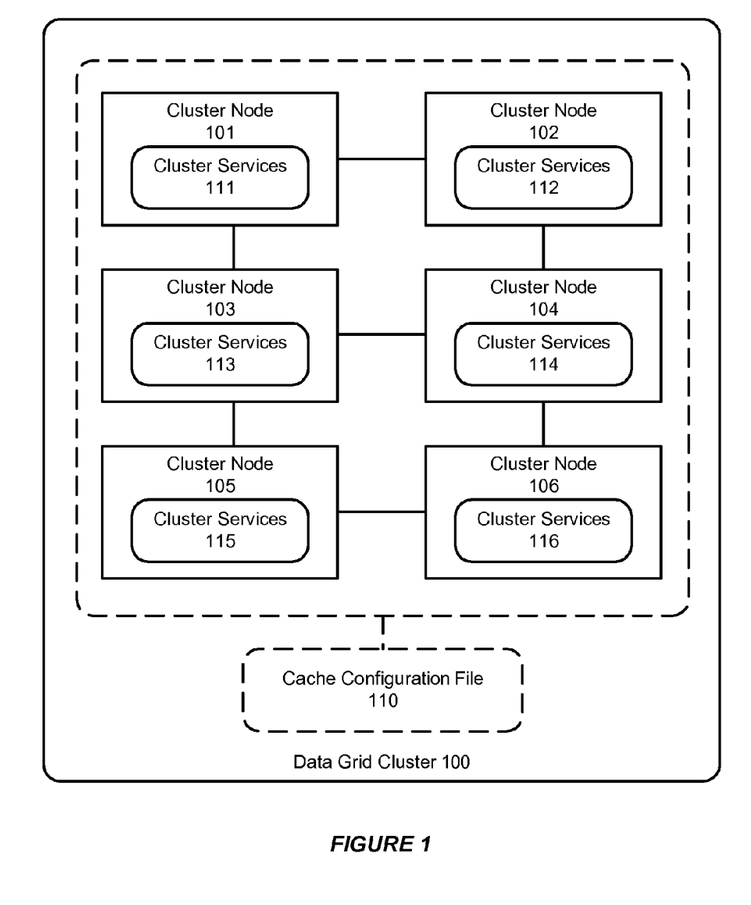
FIG. 1 is an illustration of a data grid cluster in accordance with various embodiments of the invention.

FIG. 1 is an illustration of a data grid cluster in accordance with various embodiments of the invention. As shown in FIG. 1, a data grid cluster 100, e.g. an Oracle Coherence data grid, includes a plurality of server nodes (such as cluster nodes 101-116) having various cluster services 111-116 running thereon. Additionally, a cache configuration file 110 can be used to configure the data grid cluster 100.

Pluggable Association/Unit-of-Order

In accordance with an embodiment of the invention, the distributed data grid can support pluggable association/unit-of-order in a distributed data grid.

Figure 2:
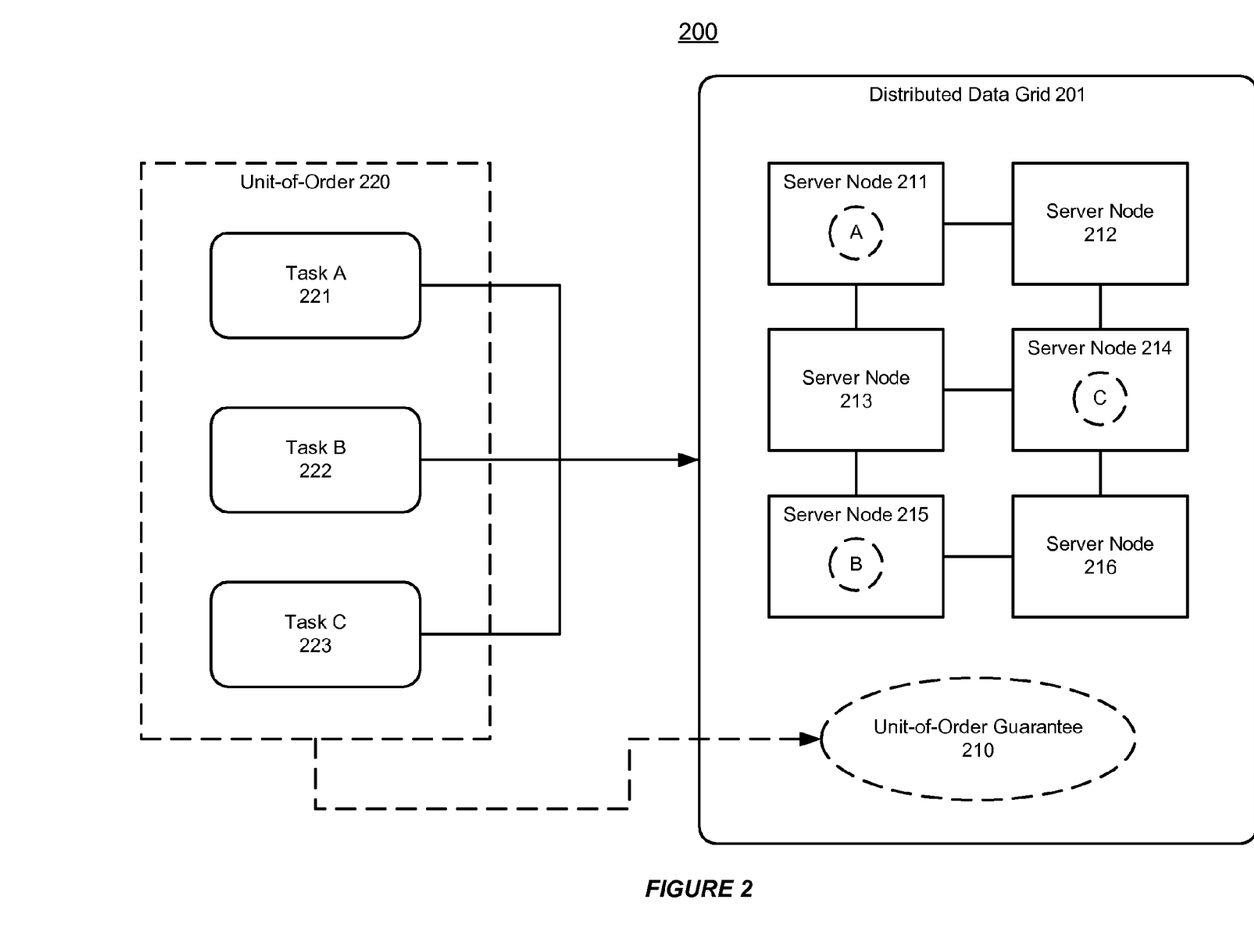
FIG. 2 shows an illustration of supporting pluggable association/unit-of-order in a distributed data grid, in accordance with an embodiment of the invention.

FIG. 2 shows an illustration of supporting pluggable association/unit-of-order in a distributed data grid, in accordance with an embodiment of the invention. As shown in FIG. 2, a distributed data grid 201 can include a plurality of server nodes, e.g. server nodes 211-216.

Furthermore, the distributed data grid 201 can receive one or more tasks, e.g. tasks A-C 221-223, from the clients. Then, the distributed data grid 201 can distribute the tasks A-C 221-223 to different server nodes for execution. For example, the server node 211 can be responsible for executing the task A 221, the server node 214 can be responsible for executing the task C 223, and the server node 215 can be responsible for executing the task B 222.

As shown in FIG. 2, the computing system 200 allows the tasks A-C 221-223 to be associated with a unit-of-order 220 (or an association). In accordance with an embodiment of the invention, a unit-of-order 220 is a partial-ordering scheme that does not impose a system-wide order of updates (i.e. not a total ordering scheme). For example, the unit-of-order 220 can be a transactional stream, where every operation in this particular stream is preserved in-order, but no order is implied to operations that happen in other streams.

Furthermore, the distributed data grid 201 can provide a unit-of-order guarantee 210, which can be supported based on a peer-to-peer clustering protocol. Thus, the system can ensure that the tasks A-C 221-223 are executed by the distributed data grid 201 in a particular order as prescribed in the unit-of-order 220, even though the tasks A-C 221-223 may be received and executed on different server nodes 211-216 in the distributed data grid 201.

Additionally, the unit-of-order 220 can be configured in a pluggable fashion, i.e., a client can change the unit-of-order 220 dynamically.

Request Ordering/Causality During Failover

In accordance with an embodiment of the invention, the distributed data grid can support request ordering/causality during failover.

Figure 3:
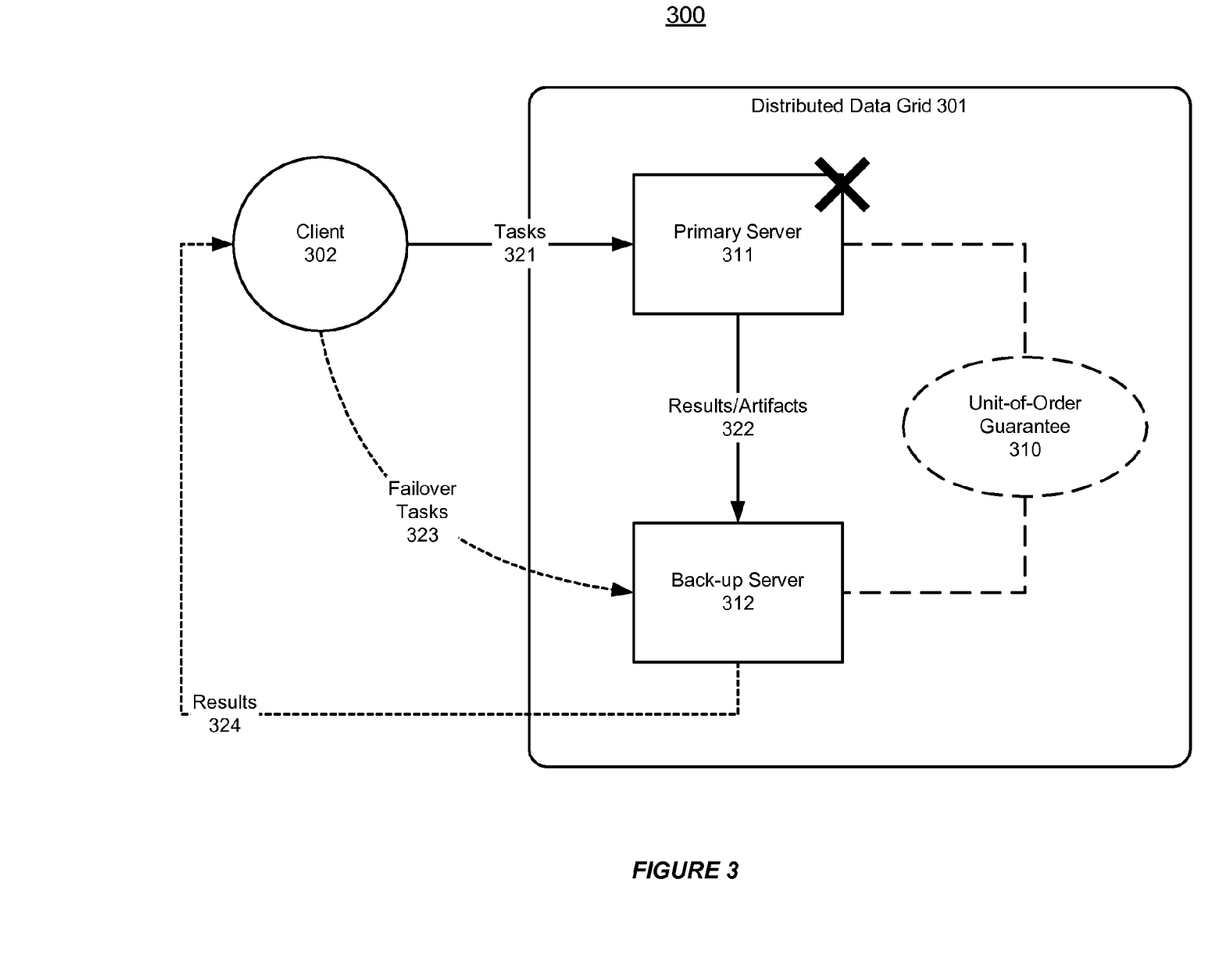
FIG. 3 shows an illustration of supporting asynchronous invocation in a distributed data grid, in accordance with an embodiment of the invention.

FIG. 3 shows an illustration of supporting asynchronous invocation in a distributed data grid, in accordance with an embodiment of the invention. As shown in FIG. 3, a server node in the distributed data grid 301 can function as a primary server 311, which is responsible for executing one or more tasks 321 received from a client 302.

Additionally, the primary server 311 can be associated with one or more back-up server nodes, e.g. a back-up server 312. As shown in FIG. 3, after the primary server 311 executes the tasks 321 received from the client 302, the primary server 311 can send different results and artifacts 322 to the back-up server 312. In accordance with an embodiment of the invention, the primary server 311 may wait for receiving an acknowledgement from the back-up server 312 before returning the results 324 to the client 302.

As shown in FIG. 3, after the primary server 311 fails, the back-up server 312 may take over and can be responsible for executing the failover tasks 323.

In order to guarantee the idempotency in executing the one or more tasks 321, the back-up server 312 can check whether each of the failover tasks 323 has already been executed by the primary server 311. For example, when a particular failover task 323 has already been executed by the primary server 311, the back-up server 312 can return the results 324 back to the client 302 immediately. Otherwise, the back-up server 312 can proceed to execute the failover task 323 before returning the results 324 back to the client.

Additionally, the back-up server 312 can determine when to execute the failover tasks 323, based on the request ordering in the unit-of-order guarantee 310. In other words, the system can make sure that the failover tasks 323 are executed accordingly to the right order, even when a failover happens in the distributed data grid 301.

Thus, during a failover scenario, the computing system 300 can ensure both the idempotency in executing the one or more tasks 321 received from the client 302 and the request ordering as provided by the unit-of-order guarantee 310 in the distributed data grid 301.

Figure 4:
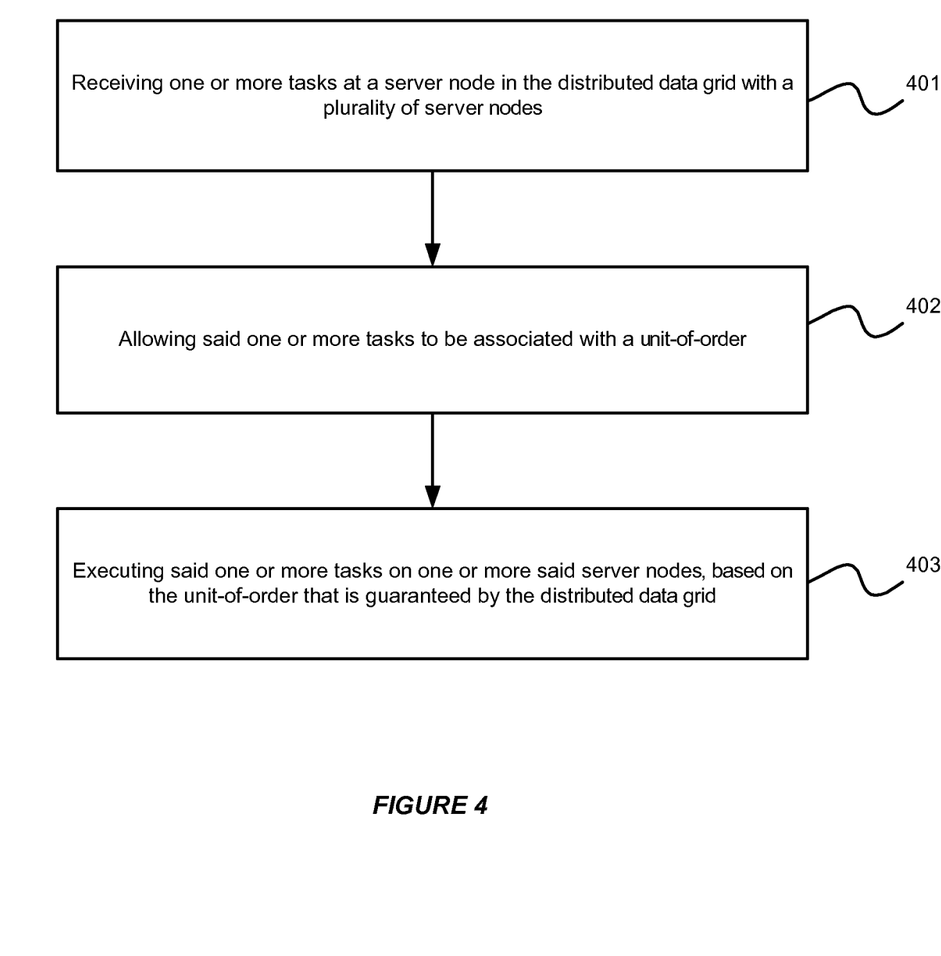
FIG. 4 illustrates an exemplary flow chart for supporting asynchronous message processing in a distributed data grid in accordance with an embodiment of the invention.

FIG. 4 illustrates an exemplary flow chart for supporting asynchronous message processing in a distributed data grid in accordance with an embodiment of the invention. As shown in FIG. 4, at step 401, a server node in a distributed data grid with a plurality of server nodes can receive one or more tasks. Then, at step 402, the system allows said one or more tasks to be associated with a unit-of-order. Furthermore, at step 403, the system can execute said one or more tasks on one or more said server nodes based on the unit-of-order that is guaranteed by the distributed data grid.

Delegatable Flow Control

In accordance with an embodiment of the invention, the distributed data grid can expose the flow control mechanism to an outside client and allows for delegatable flow control.

Figure 5:
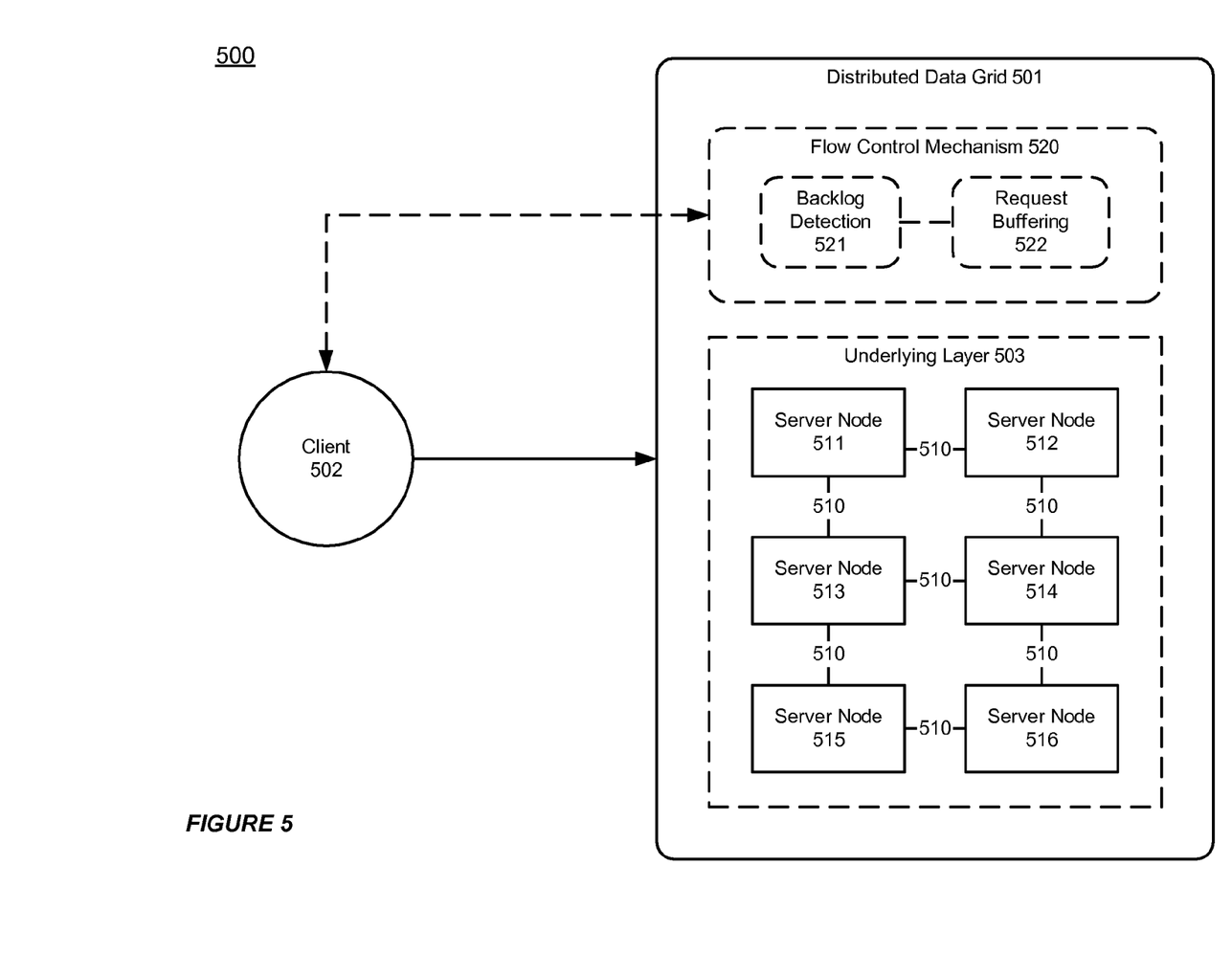
FIG. 5 shows an illustration of supporting delegatable flow control in a distributed data grid, in accordance with an embodiment of the invention.

FIG. 5 shows an illustration of supporting delegatable flow control in a distributed data grid, in accordance with an embodiment of the invention. As shown in FIG. 5, distributed data grid 501 can receive one or more tasks from a client 502. Furthermore, the distributed data grid 501 can use an underlying layer 503 for executing the received tasks.

For example, the underlying layer 503 can include a plurality of server nodes 511-516 that are interconnected using one or more communication channels 510. Thus, the delay in the distributed data grid 501, which may contribute to a backlog of tasks, can include both the delay on the server nodes 511-516 for processing the tasks and the delay in the communication channels 510 for transporting the tasks and related artifacts such as the results.

In accordance with an embodiment of the invention, the computing system 500 supports a flow control mechanism 520 that controls the execution of the tasks in an underlying layer 503 in the distributed data grid 501.

Furthermore, the flow control mechanism 520 can provide different communication facilities that supports an asynchronous (non-blocking) way of submitting data exchange requests and provides various mechanisms for modulating the control flow for underlying data transfer units (e.g. messages or packets).

As shown in FIG. 5, the flow control mechanism 520 can support request buffering 522 and backlog detection 521 capabilities. Here, the request buffering 522 represents that the distributed data grid 501 is able to buffer the incoming requests distributedly in various server nodes 511-516 in the distributed data grid 501. The backlog detection 521 represents that the distributed data grid 501 is able to detect the backlogs in processing the buffered request at different server nodes 511-516 in the underlying layer 503 (e.g. using a peer-to-peer protocol).

In accordance with an embodiment of the invention, the system allows a client to interact with the flow control mechanism 520. The flow control mechanism 520 can represent (or provide) a facet of a communication end point for a client 502. For example, the Coherence data grid can provide an application programming interface (API) to the client 502. Thus, the client 502 can dynamically configure the flow control mechanism 520 via a simple and convenient interface.

Furthermore, the flow control mechanism 520 may allow the client 502 to opt-out from an automatic flow control (which is desirable in many cases) and manually govern the rate of the request flow. Here, the flow control mechanism 520 may be preferable to be manual in various scenarios, such as an "auto-flush" use case and other use cases with backlog-related delays when the caller is a part of an asynchronous communication flow by itself.

Additionally, the computing system 500 can set a threshold in the flow control mechanism 520, wherein the threshold can regulate the backlog of tasks to be executed in the distributed data grid 501. For example, when the length of the backlog of tasks to be executed in the distributed data grid 501 exceeds the threshold, the distributed data grid 501 can either reject a request for executing said tasks, or reconfigure the tasks to be executed at a later time (i.e., reconfiguring a synchronous task to an asynchronous task).

Figure 6:
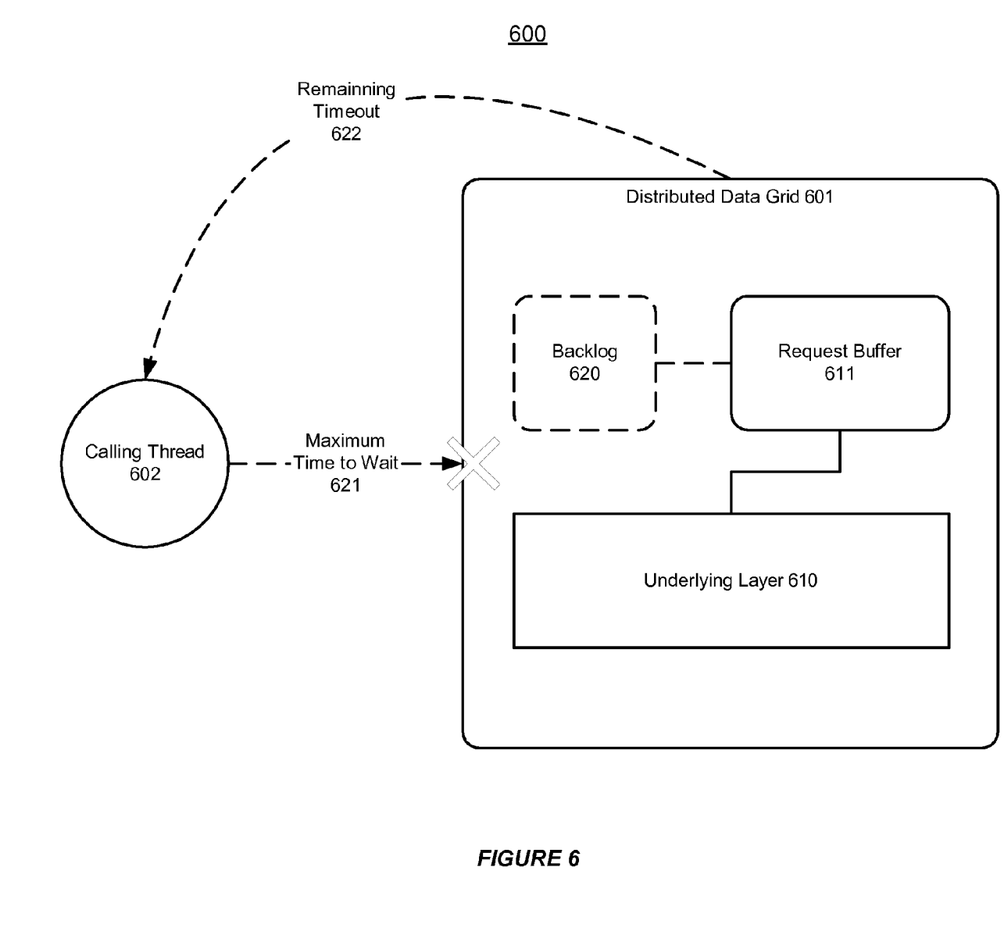
FIG. 6 shows an illustration of performing backlog draining in a distributed data grid, in accordance with an embodiment of the invention.

FIG. 6 shows an illustration of performing backlog draining in a distributed data grid, in accordance with an embodiment of the invention. As shown in FIG. 6, a calling thread 602 in the computing system 600, which is associated with a client, can check for an excessive backlog 620 that relates to a distributed request buffer 611 in the distributed data grid 601.

Using an API provided by the distributed data grid 601, the client (i.e. via the calling thread 602) can provide the distributed data grid 601 with information about the maximum amount of time it can wait (e.g. in milliseconds) 621.

In the response, the distributed data grid 601 can provide the calling thread 602 with the information on the remaining timeouts 622. Then, the distributed data grid 601 can block the calling thread 602 while draining the backlog 620 (i.e. dispatching the buffered tasks in the request buffer 611 to the underlying layer 610 for execution).

Figure 7:
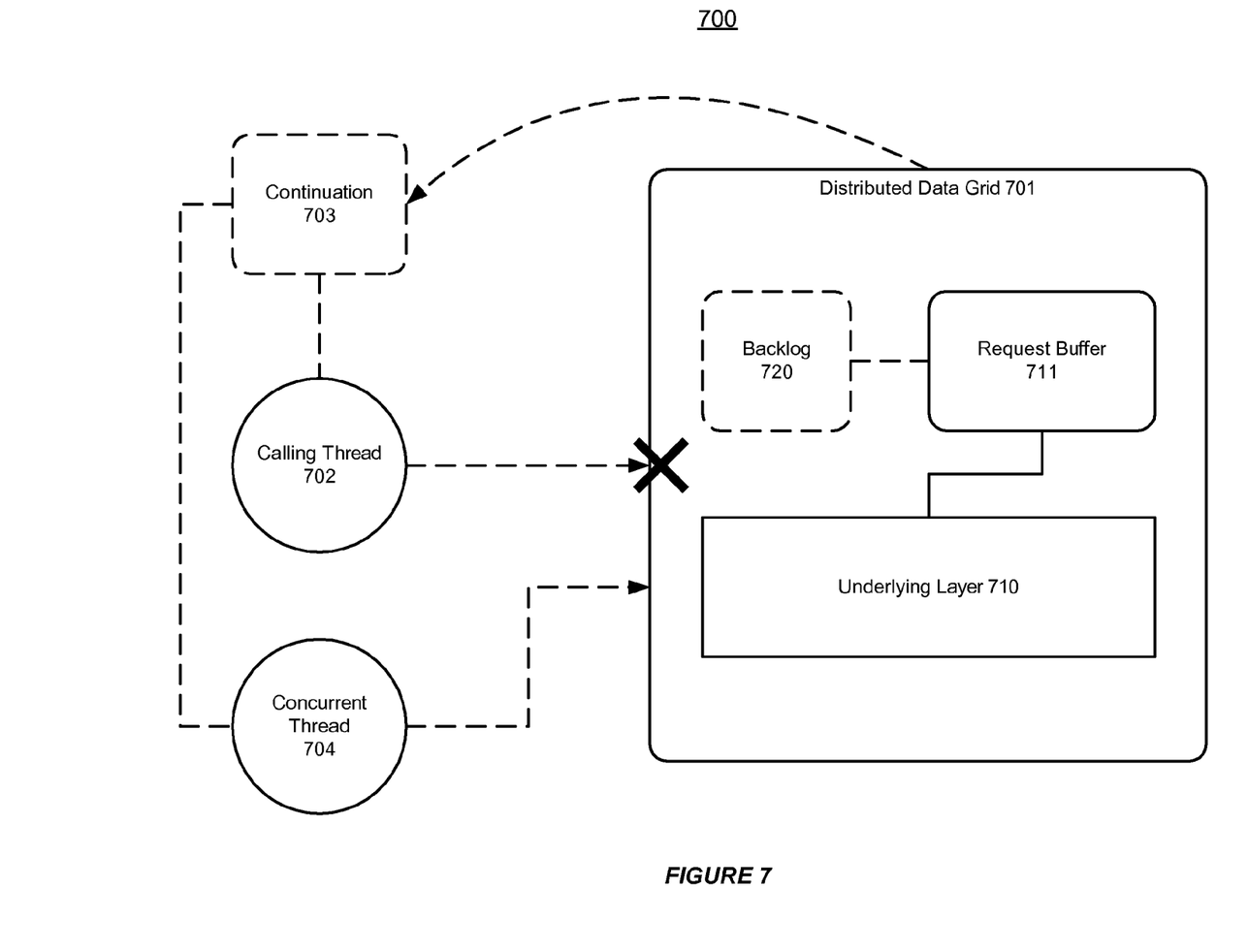
FIG. 7 shows an illustration of providing a future task to a distributed data grid, in accordance with an embodiment of the invention.

FIG. 7 shows an illustration of providing a future task to a distributed data grid, in accordance with an embodiment of the invention. As shown in FIG. 7, a calling thread 702 in the computing system 700, which is associated with a client, can check for an excessive backlog 720 that relates to a distributed request buffer 711 in the distributed data grid 701.

Using an API provided by the distributed data grid 701, the client (i.e. via the calling thread 702) can provide the distributed data grid 701 with a future task, e.g. a continuation 703, if the backlog 720 is abnormal (e.g. when the underlying communication channel is clogged).

Then, after the backlog 720 returns to normal, the distributed data grid 701 can call the continuation 703. Thus, the system can dispatch the task contained in the continuation 703 to the underlying layer 710 for execution.

As shown in FIG. 7, the continuation 703 can be called on any thread, including a thread 704 that is concurrent with the calling thread 702. Also, the continuation 703 can be called by the calling thread 702 itself.

Figure 8:
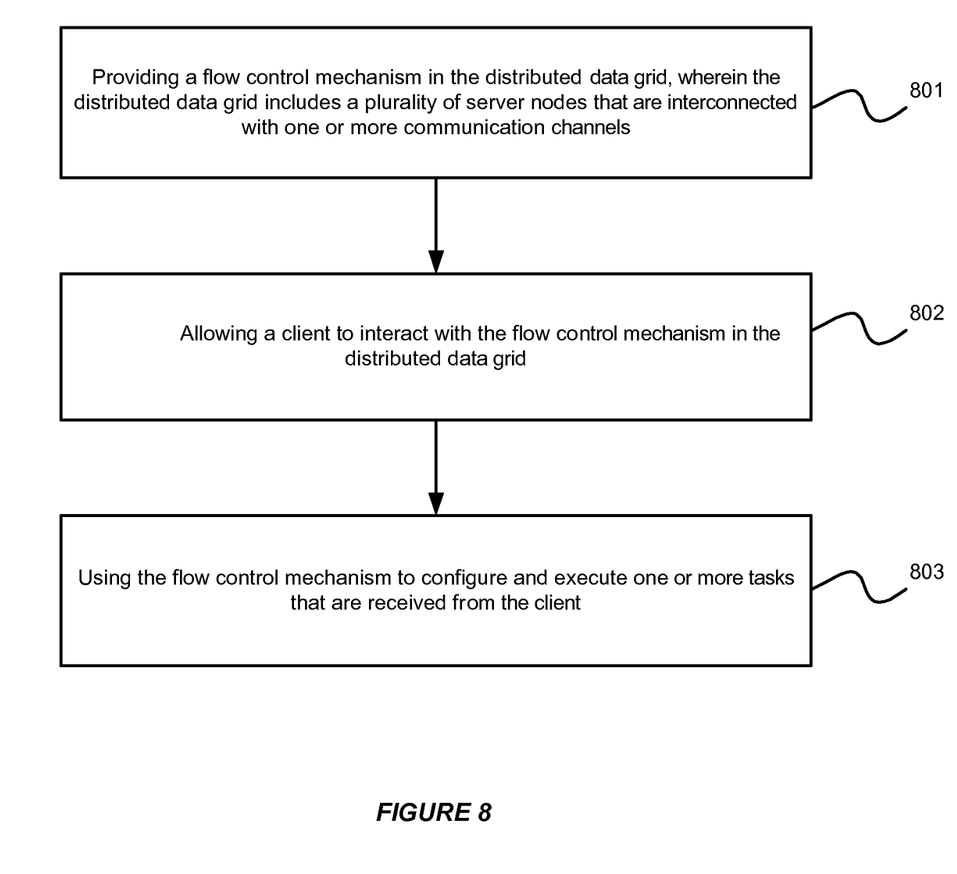
FIG. 8 illustrates an exemplary flow chart for supporting delegatable flow control in a distributed data grid in accordance with an embodiment of the invention.

FIG. 8 illustrates an exemplary flow chart for supporting delegatable flow control in a distributed data grid in accordance with an embodiment of the invention. As shown in FIG. 8, at step 801, the system can provide a flow control mechanism in the distributed data grid, wherein the distributed data grid includes a plurality of server nodes that are interconnected with one or more communication channels. Then, at step 802, the system allows a client to interact with the flow control mechanism in the distributed data grid. Furthermore, at step 803, the system can use the flow control mechanism for configuring and executing one or more tasks that are received from the client.

An Exemplary Application Programming Interface (API)

The following is an exemplary application programming interface (API), which allows a client to dynamically configure the flow control mechanism in a distributed data grid such as the Coherence data grid.

```
public interface FlowControl
{
    public void flush( );
    public long drainBacklog(long cMillis);
    public boolean checkBacklog(Continuation<Void> continueNormal);
}
```

The FlowControl interface can include a flush( ) function, which may be a non-blocking call. Furthermore, the flush( ) function ensures that the buffered asynchronous operations are dispatched to the underlying tier.

Additionally, the FlowControl interface can include a drainBacklog(long cMillis) function, which can check for an excessive backlog in the distributed data grid and allows for blocking the calling thread for up to a specified amount of time.

As shown in the above, the drainBacklog(long cMillis) function can take an input parameter, cMillis, which specifies the maximum amount of time to wait (e.g. in milliseconds). Alternatively, the input parameter, cMillis, can be specified as zero, which indicates an infinite waiting time.

Then, the drainBacklog(long cMillis) function can return the remaining timeout to the calling thread. Alternatively, the drainBacklog(long cMillis) function can return a negative value if timeout has occurred. Additionally, the drainBacklog(long cMillis) function can return zero, which indicates that the backlog is no longer excessive.

Furthermore, the above FlowControl interface can include a checkBacklog(Continuation<Void> continueNormal) function, which checks for an excessive backlog. The checkBacklog(Continuation<Void> continueNormal) function can return true if the underlying communication channel is backlogged or return false if otherwise.

When the underlying communication channel is indeed clogged, the checkBacklog(Continuation<Void> continueNormal) function can provide a future work, e.g. using an input parameter, continueNormal.

Then, the future work, continueNormal, can be called after the backlog is reduced back to normal. Furthermore, the future work, continueNormal, can be called by any thread, which is concurrent with the calling thread, or by the calling thread itself. Additionally, the continuation is called only when if the checkBacklog(Continuation<Void> continueNormal) function returns true.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modification and variation include any relevant combination of the described features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting asynchronous invocation of tasks in a distributed data grid comprising a plurality of server nodes, the method comprising:
  using a peer-to-peer clustering protocol of said plurality of server nodes of said distributed data grid to support a unit-of-order guarantee;
  receiving at a server node of the plurality of server nodes in the distributed data grid a plurality of tasks invoked asynchronously by an associated client, wherein said plurality of tasks are associated with a unit-of-order which prescribes an order in which said plurality of tasks must be executed; and
  executing said plurality of tasks on multiple server nodes of the plurality of server nodes in the distributed data grid in the order prescribed by said unit-of-order in accordance with the unit-of-order guarantee supported by the peer-to-peer clustering protocol of said plurality of server nodes of said distributed data grid,
  wherein the unit-of-order is enabled to be configured in a pluggable fashion such that the associated client is enabled to change the unit-of-order dynamically.

2. The method according to claim 1, wherein:
  the unit-of-order is a partial ordering scheme which does not impose system-wide ordering in the order prescribed by said unit-of-order of tasks not associated with said unit-of-order in said plurality of server nodes of said distributed data grid.

3. The method according to claim 1, wherein:
  the plurality of tasks are associated with a transactional stream, and wherein the unit-of-order prescribes that the order in which said plurality of tasks must be executed is identical to an order in which said plurality of tasks is asynchronously invoked; and
  whereby said plurality of tasks are executed in-order on said multiple server nodes of the plurality of server nodes in the distributed data grid.

4. The method according to claim 1, further comprising:
  allowing the server node in the distributed data grid to be a primary server for executing said plurality of tasks, and
  using at least one another server in the distributed data grid as a back-up server for executing said plurality of tasks.

5. The method according to claim 4, further comprising:
  sending, via the primary server, results and artifacts that are associated with an execution of said plurality of tasks to the back-up server, before returning the results to the client.

6. The method according to claim 5, further comprising:
  checking, via the back-up server, whether said plurality of tasks have been executed by the primary server, when the primary server fails.

7. The method according to claim 6, further comprising:
  returning the results to the client, if said plurality of tasks have been executed by the primary server.

8. The method according to claim 6, further comprising:
  determining, via the back-up server, when to execute said plurality of tasks based on the unit-of-order guaranteed by the distributed data grid, if said plurality of tasks have not been executed by the primary server.

9. The method according to claim 8, further comprising:
  returning, via the backup server, the results to the client after executing said plurality of tasks.

10. A system for supporting asynchronous message processing comprising:
  a distributed data grid comprising a plurality of server nodes, each server node of the plurality of server nodes comprising a microprocessor and a memory,
  wherein the distributed data grid is configured to perform steps comprising:
    using a peer-to-peer clustering protocol of said plurality of server nodes of said distributed data grid to support a unit-of-order guarantee,
    receiving at a server node of the plurality of server nodes in the distributed data grid a plurality of tasks invoked asynchronously by an associated client, wherein said plurality of tasks are associated with a unit-of-order which prescribes an order in which said plurality of tasks must be executed, and
    executing said plurality of tasks on multiple server nodes of the plurality of server nodes in the distributed data grid in the order prescribed by said unit-of-order in accordance with the unit-of-order guarantee supported by the peer-to-peer clustering protocol of said plurality of server nodes of said distributed data grid, wherein the distributed data grid is configured to enable said unit-of-order to be configured in a pluggable fashion such that the associated client is enabled to change the unit-of-order dynamically.

11. The system according to claim 10, wherein:
the unit-of-order is a partial ordering scheme which does not impose system-wide ordering in the order prescribed by said unit-of-order of tasks not associated with said unit-of-order in said plurality of server nodes of said distributed data grid.

12. The system according to claim 10, wherein:
the plurality of tasks are associated with a transactional stream, and wherein the unit-of-order prescribes that the order in which said plurality of tasks must be executed is identical to an order in which said plurality of tasks is asynchronously invoked; and
whereby said plurality of tasks are executed in-order on said multiple server nodes of the plurality of server nodes in the distributed data grid.

13. The system according to claim 10, wherein:
said server node is a primary server for executing said plurality of tasks in the distributed data grid, and at least one server node in the distributed data grid is used as a back-up server for executing said plurality of tasks.

14. The system according to claim 13, wherein:
the primary server operates to send results and artifacts that are associated with an execution of said plurality of tasks to the back-up server, before returning the results to the client.

15. The system according to claim 14, wherein:
the back-up server operates to check whether said plurality of tasks have been executed by the primary server, when the primary server fails.

16. The system according to claim 15, wherein:
the back-up server operates to return the results to the client, if said plurality of tasks have been executed by the primary server.

17. The system according to claim 15, wherein:
the back-up server operates to
determine when to execute said plurality of tasks based on the unit-of-order guaranteed by the distributed data grid, if said plurality of tasks have not been executed by the primary server, and
return the results to a client after executing said plurality of tasks.

18. A non-transitory machine readable storage medium having instructions stored thereon for supporting asynchronous invocation of tasks in a distributed data grid, which instructions, when executed, configure said distributed data grid to perform steps comprising:
using a peer-to-peer clustering protocol of said plurality of server nodes of said distributed data grid to support a unit-of-order guarantee;
receiving at a server node of the plurality of server nodes in the distributed data grid a plurality of tasks invoked asynchronously by an associated client, wherein said plurality of tasks are associated with a unit-of-order which prescribes an order in which said plurality of tasks must be executed; and
executing said plurality of tasks on multiple server nodes of the plurality of server nodes in the distributed data grid in the order prescribed by said unit-of-order in accordance with the unit-of-order guarantee supported by the peer-to-peer clustering protocol of said plurality of server nodes of said distributed data grid, wherein the unit-of-order is enabled to be configured in a pluggable fashion such that the associated client is enabled to change the unit-of-order dynamically.

19. A method for supporting asynchronous invocation of tasks in a distributed data grid comprising a plurality of server nodes, the method comprising:
using a peer-to-peer clustering protocol of said plurality of server nodes of said distributed data grid to support a unit-of-order guarantee;
receiving at a server node of the plurality of server nodes in the distributed data grid a plurality of tasks invoked asynchronously by an associated client, wherein said plurality of tasks are associated with a unit-of-order which prescribes an order in which said plurality of tasks must be executed; and
executing said plurality of tasks on multiple server nodes of the plurality of server nodes in the distributed data grid in the order prescribed by said unit-of-order in accordance with the unit-of-order guarantee supported by the peer-to-peer clustering protocol of said plurality of server nodes of said distributed data grid,
wherein the unit-of-order is a partial ordering scheme which does not impose system-wide ordering in the order prescribed by said unit-of-order of tasks not associated with said unit-of-order in said plurality of server nodes of said distributed data grid.

20. The method according to claim 19, wherein:
the unit-of-order is enabled to be configured in a pluggable fashion.

21. The method according to claim 20, wherein:
the plurality of tasks are associated with a transactional stream, and wherein the unit-of-order prescribes that the order in which said plurality of tasks must be executed is identical to an order in which said plurality of tasks is asynchronously invoked; and
whereby said plurality of tasks are executed in-order on said multiple server nodes of the plurality of server nodes in the distributed data grid.

22. The method according to claim 19, further comprising:
allowing the server node in the distributed data grid to be a primary server for executing said plurality of tasks, and
using at least one another server in the distributed data grid as a back-up server for executing said plurality of tasks.

23. The method according to claim 22, further comprising:
sending, via the primary server, results and artifacts that are associated with an execution of said plurality of tasks to the back-up server, before returning the results to the associated client.

24. The method according to claim 23, further comprising:
selectively checking via the back-up server responsive to a failure of the primary server whether said plurality of tasks have been executed by the primary server.

25. The method according to claim 24, further comprising:
selectively returning the results to the client responsive to the plurality of tasks having been executed by the primary server.

26. The method according to claim 24, further comprising:

selectively determining, via the back-up server, when to execute said plurality of tasks based on the unit-of-order guaranteed by the distributed data grid responsive to the plurality of tasks having not been executed by the primary server.

27. The method according to claim 26, further comprising:
returning, via the backup server, the results to the client after executing said plurality of tasks.

* * * * *

UNITED STATES PATENT AND TRADEMARK OFFICE
CERTIFICATE OF CORRECTION

Page 1 of 1

PATENT NO. : 9,703,638 B2
APPLICATION NO. : 14/322540
DATED : July 11, 2017
INVENTOR(S) : Gleyzer et al.

It is certified that error appears in the above-identified patent and that said Letters Patent is hereby corrected as shown below:

In the Drawings

On sheet 6 of 8, in FIGURE 6, under Reference Numeral 622, Line 1, delete "Remainning" and insert -- Remaining --, therefor.

Signed and Sealed this
Ninth Day of October, 2018

Andrei Iancu
*Director of the United States Patent and Trademark Office*